United States Patent [19]

Akeel

[11] Patent Number: 4,805,477
[45] Date of Patent: Feb. 21, 1989

[54] MULTIPLE JOINT ROBOT PART

[75] Inventor: Hadi A. Akeel, Rochester Hills, Mich.

[73] Assignee: GMF Robotics Corporation, Auburn Hills, Mich.

[21] Appl. No.: 111,304

[22] Filed: Oct. 22, 1987

[51] Int. Cl.[4] ............... G05G 11/00; B25J 17/00; B25J 17/02
[52] U.S. Cl. .................... 74/479; 901/28; 901/29
[58] Field of Search ............... 74/479; 901/15, 19, 901/27–29; 414/2, 4, 735

[56] References Cited

U.S. PATENT DOCUMENTS

| | | | |
|---|---|---|---|
| 3,580,099 | 5/1971 | Mosher | 901/28 |
| 3,610,058 | 10/1971 | Mueller et al. | 901/28 |
| 3,614,899 | 10/1971 | Wuenscher | 74/105 |
| 4,353,677 | 10/1982 | Susnjara et al. | 901/29 |
| 4,402,234 | 9/1983 | Malarz et al. | 901/29 |
| 4,435,120 | 3/1984 | Ikeda et al. | 901/15 |
| 4,477,221 | 10/1984 | Sega et al. | 901/29 |
| 4,511,305 | 4/1985 | Kawai et al. | 901/29 |
| 4,566,843 | 1/1986 | Iwatsuka et al. | 414/735 |
| 4,685,349 | 8/1987 | Wada et al. | 74/479 |
| 4,696,659 | 9/1987 | Molaug | 901/28 |
| 4,723,460 | 2/1988 | Rosheim | 74/479 |
| 4,724,716 | 2/1988 | Kawai | 74/479 |
| 4,744,264 | 5/1988 | Milenkovic | 901/29 |

FOREIGN PATENT DOCUMENTS

| | | | |
|---|---|---|---|
| 156340 | 4/1978 | Netherlands | 901/28 |
| 422580 | 9/1974 | U.S.S.R. | 901/28 |

Primary Examiner—Allan D. Herrmann
Attorney, Agent, or Firm—Brooks & Kushman

[57] ABSTRACT

A multiple joint robot part comprising a mechanical wrist mechanism utilizes universal joints to effect simultaneous rotations about three mutually perpendicular axes to thereby impart pitch, yaw and roll motions to a robotic end effector attached thereto. All of the wrist motions are kinematically independent, and the pitch and yaw motions are activated by means of linear motion actuators. Pitch and yaw bend angles are traversed gradually in two or more stages to allow a generous bend radius for internally routed service lines to the end effector.

17 Claims, 2 Drawing Sheets 4,805,477

MULTIPLE JOINT ROBOT PART

TECHNICAL FIELD

This invention relates to multiple joint robot parts and, more particularly, to multiple joint robot parts which operatively transfer bend movements in more than one stage.

BACKGROUND ART

Robotic parts including wrist mechanisms are designed to orient the robot's end effector as demanded by workpiece placement. Wrist mechanisms provide three articulations that offer motions commonly called pitch, yaw and roll. Similar articulations of the arm deliver the wrist assembly anywhere in the robot's sphere of influence. Thereafter it requires three more articulations of the wrist mechanism for universal orientation of the end effector.

One class of conventional prior art wrist mechanisms has a wrist structure mounted on a rotating element which constitutes one of the wrist axes of movement (i.e the roll axis). Pitch and yaw axes are typically built up on the rotating element and are usually mutually orthogonal. One of the pitch and yaw axes (i.e. a first pitch axis) is perpendicular to the roll axis. The other of the yaw and pitch axes (i.e. a second pitch axis) is usually perpendicular to the first pitch axis and may or may not intersect the roll axis. This class of wrist is usually known as a roll-pitch-pitch-wrist (i.e. RPP wrist).

Some RPP wrists have all axes intersecting at a single point as disclosed in U.S. Pat. Nos. 3,784,031, 4,068,536, 4,402,234, 4,499,790, 4,574,655, 4,594,918 and 4,608,884. Other RPP wrists have pairs of intersecting axes with two points for axes intersection that are offset from each other as described in U.S. Pat. Nos. 3,826,383 and 4,030,617. Patent application Ser. No. 928,745, filed Nov. 10, 1986 and having the same Assignee as the present application also discloses such a wrist.

RPP wrists usually require the use of gears for the transmission of motion from stationary actuators to the second and third pitch axes across the interface of the bearing elements of the roll axis. One disadvantage of such an arrangement is the kinematic interdependence of the three axes that results from mounting the two pitch axes on the roll axis. This interdependence not only complicates the data processing of axes commands but also makes the motion unnatural and difficult to relate to in terms of human wrist movements. This is of particular importance for robots that are taught by the lead-through method with end effectors led by the hand of a human operator. The unnatural feeling of the robot movement generates difficulties in moving the robot by hand. For example, if the required motion is a yaw motion in a horizontal plane, the roll axis has to be oriented such that one of the two pitch axes is vertical. The operator may spend unnecessary time trying to figure out the appropriate orientation and a smooth approach to that orientation.

Most mechanical wrist mechanisms do not provide an unobstructed passageway therethrough to provide protection for hoses and wires which respectively provide fuel and power to a work tool mounted on the free end of the wrist mechanism. U.S. Pat. No. 4,218,166 discloses a multi-axes wrist mechanism which provides independent movement about two axes and which maintains an unobstructed passage through a stationary base to a work tool.

The U.S. Pat. No. 4,402,234 to Malarz et al discloses a wrist mechanism having three independent rotational axes which are mutually intersecting. A gearing mechanism controls the independent rotation of components supported for rotation about the three axes and also provides an unobstructed internal passageway for housing hoses and/or wires. Use of such a wrist mechanism however, is somewhat limited and difficult due to the relatively small internal bend radius of the wrist mechanism. This imposes limitations on the amount of rotational movement that such hoses and wires will permit. Such a small bend radius furthermore makes programming of the robot to the which the wrist mechanism is attached more difficult. This occurs because the freedom of movement of the wrist mechanism is limited, which the programmer must take into consideration.

The above-noted patent application discloses a three-axes wrist mechanism also having an unobstructed passageway and includes three independent rotational axes which have a pair of mutually intersecting points to provide additional flexibility in positioning a wide variety of tool members in a work envelope. The above-noted application is an improvement over the U.S. Pat. No. 4,402,234 in that the wrist mechanism provides a relatively generous internal bend radius to simplify programming of the robot and also offers the use of larger gears so that the wrist mechanism can support and manipulate relatively heavy tools attached thereto.

U.S. Pat. Nos. 4,576,545, 4,353,677, 4,435,120, 4,568,311 and 4,624,621 discloses wrist mechanisms having multiple bends so that the wrist mechanism can span an arcuate length. However, each of the wrist mechanisms requires the use of gears to synchronize and affect a gradual orientation change in the pitch and yaw motions in two or more stages of bend. The use of gears not only complicates the mechanism and increases its cost, but also reduces its power transmission, efficiency, accuracy and reliability.

An early example of an attempt to provide a flexible robot arm is disclosed in the U.S. Pat. No. 4,107,948. The robot arm comprises a plurality of interconnected rigid links which are adapted to be driven for controlled movement by a robot drive mechanism. Successive links are linked together in the fashion of chain links and are mutually pivotally connected by means of universal joints disposed between the interlinking ends of the links. The links define at least a part of the universal joints. A robot arm member has a protruding driven shaft for turning the jointed robot arm about its own axis and is arranged to be driven by a drive ring in sliding contact with the exterior of one of the universal joints. However, the mechanism is constructed so that it is locked at all times and cannot be utilized as described.

A flexible robot ar related to U.S. Pat. No. 4,107,948 noted above, is disclosed in U.K. Patent Application No. 2,127,774. This robot arm corrects the inoperativeness of the U.S. Pat. No. 4,107,948 device by adding a sliding motion to the rotary freedom of joints 11 and 15. The resulting robot arm has: (1) rotary and sliding joints or parts; (2) five rotary joints; (3) two sliding joints; and (4) six linkages.

U.S. Pat. No. 4,531,885 discloses a device for use in a robot which can displaced angularly about orthogonal axes by use of two linear actuators. The device includes a central element supported to the wrist structure on a universal joint. The central element carries an output shaft and may be oriented by rotating a shaft that carries the universal joint. A bearing separates the point of attachment of the center element from the points of attachment of the linear actuators and allows their relative rotation.

The device of the '885 Patent is limited by the use of a single universal joint which limits the angle size by which the central element can be allowed to rotate about the two orthogonal axes. Also, the device is constructed so that a central cavity cannot be constructed to allow for internal routing of service lines to the end effector of the robot. Because the first two axes of wrist motion are bending or pitch motion and the third a roll motion, this type of wrist is usually known as a pitch pitch roll or PPR wrist.

Another prior art robot wrist is similar to the wrist described in the '885 Patent except that the universal joint is replaced by a spherical gear arrangement which allows angular movement about two orthogonal axes as well as the rotation of a central element.

DISCLOSURE OF THE INVENTION

An object of the present invention is to provide an improved multiple joint robot part which moves in a fashion similar to a human wrist and which has three axes of freedom of movement which are kinematically independent.

Another object of the invention is to provide an improved mechanical wrist mechanism which is constructed solely of rotating joints and which allows the routing of flexible end effector service lines, such as hoses, cables and the like, internal to the wrist mechanism.

Yet still another object of the present invention is to provide an improved mechanical wrist mechanism which is constructed to transfer bending movement in a four bar linkage fashion about two orthogonal axes in more than one stage, to thereby provide a generous bend radius for internally routed service lines at bend angles equal to or greater than 90 degrees.

In carrying out the above objects and other objects of the invention, a robot part constructed in accordance with the present invention is adapted to be driven by a robot drive means. The part includes a relatively stationary base and a first pair of independent rotational axes having a first point of mutual intersection (A) and being movable relative to each other. The part further comprises a second pair of independent rotational axes having a second point of mutual intersection (D) spaced a first distance (AD) from the first point of mutual intersection and being movable relative to each other. First link means is supported on the base and a second link means is supported on the first link means. The first link means is rotationally supported on each of the first pair of axes and the second link means is rotationally supported on each of the second pair of axes. Third link means is provided for establishing a second distance (BC) defined by first and second end points (B and C, respectively) fixed relative to the base and the second link means, respectively, during rotation of the first and second link means about their respective axes. The first point of intersection and the first end point (A and B, respectively) define a third distance (AB) and the second point of intersection and the second end point (D and E, respectively) define a fourth distance (DC). Actuator means provides independent rotation of said first link means about each of the first pair of axes to operatively transfer corresponding bend movements in more than one stage to selectively establish the position of the second link means relative to the base.

Further in carrying out the above objects and other objects of the present invention, a mechanical wrist mechanism constructed in accordance with the present invention is adapted to be driven by a robot drive. The mechanism includes a relatively stationary base and a first pair of independent rotational axes having a first point of mutual intersection (A) and being movable relative to each other. A second pair of independent rotational axes has a second point of mutual intersection (D) spaced a first distance (AD) from the first point of mutual intersection and are movable relative to each other. A first link means is supported on said base and a second link means is supported on the first link means. The first link means is rotationally supported on each of the first pair of axes and the second link means is rotationally supported on each of the second pair of axes.

The mechanism further includes a rotary drive shaft and an end effector, a support member having an end effector mounting surface. The support member is rotatably supported on the second link means for rotating about a third independent rotational axis intersecting the second pair of axes at the second point of mutual intersection (D). Third link means is in driving engagement with the drive shaft and the tool support member for transferring the rotary motion of the drive shaft to the support member while establishing a second distance (BC) defined by first and second end points (B and C, respectively) fixed relative to the base and the second link means respectively, during rotation of the first and second link means about their axes. Actuator means provides independent rotation of said first link means about the first pair of axes to operatively transfer corresponding bend movements in more than one stage to selectively establish the position of said mounting surface relative to the base within a work envelope.

Preferably, the actuator means includes first and second reciprocable linear actuators for rotating the first link means about the first pair of axes.

Also, preferably, the sum of the distances AB and BC is less than the sum of the distances AD and DC. The distances define a four bar linkage.

Yet, still preferably, the motions about each of the second pair of axes and the third axis are all kinematically independent from one another.

The robot part as constructed above provides numerous advantages including the above-noted objects of the invention. For example, the part is relatively inexpensive to construct when compared to conventional mechanisms having complex power transmission elements. Also, the robot part has an inherently higher mechanical efficiency such that when backdriven by the hand lead through method of robot programming, the part offers relatively low mechanical resistance to the lead through effort.

Other advantages of the present invention will be readily appreciated as the same becomes better understood by reference to the following detailed description when considered in connection with the accompanying drawings.

BEST MODE FOR CARRYING OUT THE INVENTION

Figure 1:
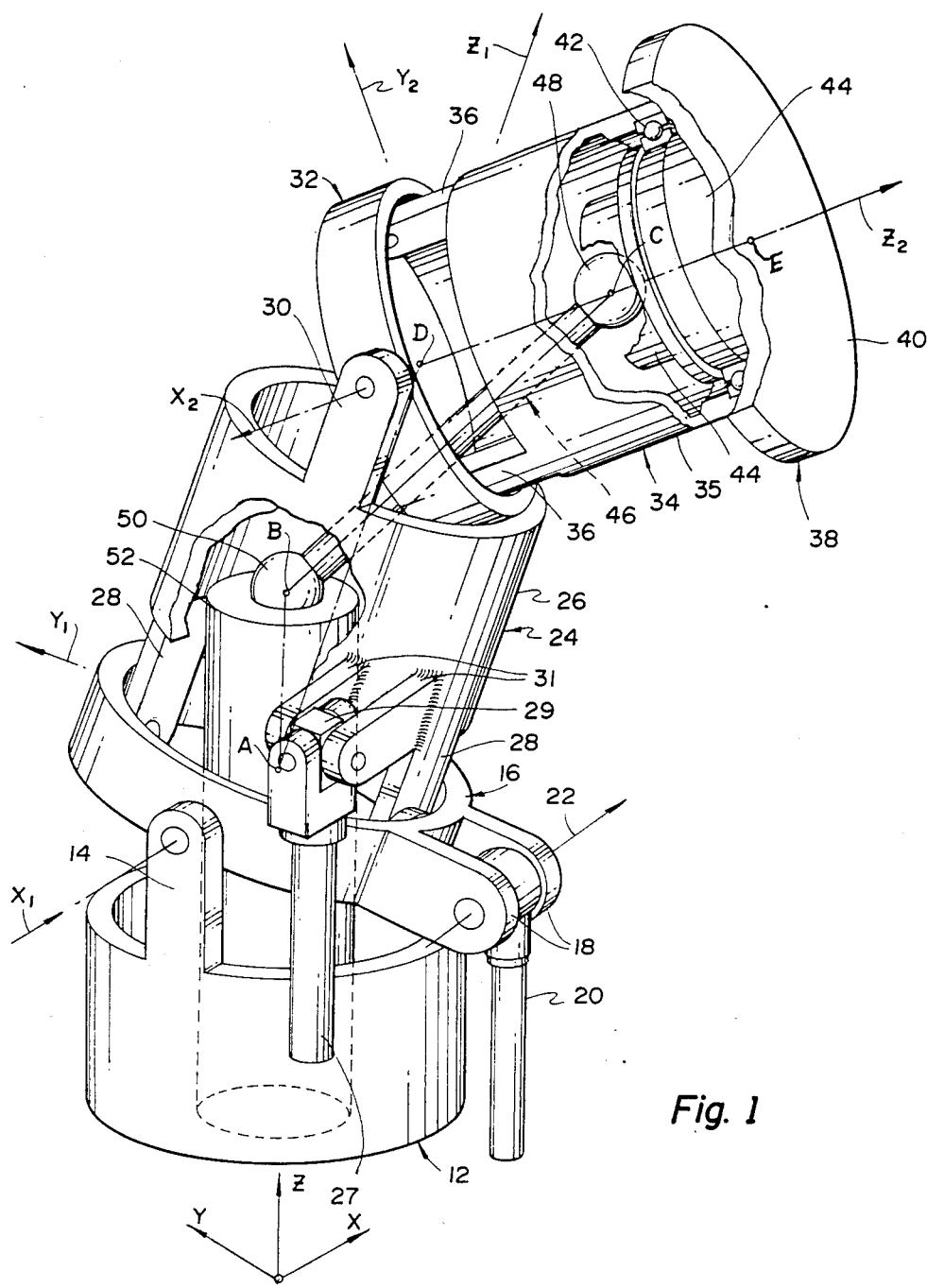
FIG. 1 is a perspective view, partially broken away and in cross-section of a robot part constructed in accordance with the present invention.

Referring now to FIG. 1, there is shown a multiple joint robot part and, in particular, a multiple joint mechanical wrist mechanism, generally indicated at 10, and constructed in accordance with the present invention. The wrist mechanism 10 can be connected to a boom or support arm of many different types of robots in order to move an end effector or work tool within a work envelope.

As illustrated in FIG. 1, a work tool (not shown) or other end effector may be mounted at the free end of the wrist mechanism 10. The tool may comprise a welder or paint sprayer or other device which is useful in the assembly or finishing a product.

The mechanism 10 includes a hollow, cylindrical, relatively stationary base or base member, generally indicated at 12, which forms the mounting structure of the wrist mechanism 10 and which is typically adapted to be connected to the arm of a robot. Alternatively, the base 12 may comprise the end of a robot arm.

The base 12 includes a pair of integrally formed mounting flanges 14 (only one of which is shown) which hingedly supports a universal joint in the form of a collar member, generally indicated at 16, for rotation about an axis $X_1$. The collar member 16 includes a pair of spaced, integrally formed flanges 18 which hingedly support a reciprocable linear actuator 20 at one end thereof for rotation about an axis 22 which is parallel to the axis $X_1$. The opposite end of the linear actuator 20 is adapted to be driven by a robot drive mechanism such as a linear drive cylinder or a rack and pinion arrangement (not shown).

A Cartesian coordinant system X, Y and Z is associated with the relatively stationary base 12. A coincident Cartesian coordinant system $X_1$, $Y_1$ and $Z_1$ is defined at point A and is movable with the collar member 16. When the actuator 20 is actuated through a displacement along its longitudinal axis, the collar member 16 rotates relative to the base about the axis $X_1$. This rotation also displaces the axis $Y_1$ and the axis $Z_1$ away from the axes Y and Z, respectively.

The wrist mechanism 10 also includes a first link means or mechanism, generally indicated at 24, which is hingedly connected at the inner surface of the collar member 16 to rotate about the axis $Y_1$. The first link mechanism 24 includes a hollow, cylindrical housing 26 and a first pair of flanges 28 integrally formed with the housing 26 for pivotal connection to the collar member 16. The axis $Y_1$ is orthogonal to the axis $X_1$ and intersects at a point A.

A second reciprocable linear actuator 27 is hingedly connected to the first housing 26 by means of a pivot block 29 which is pivotally mounted between a pair of spaced mounting flanges 31 which are integrally connected to the housing 26, such as by welding. The actuator 27 consequently is hinged along two orthogonal axes which parallel the axes $X_1$ and $Y_1$. As with the linear actuator 20, the linear actuator 27 is adapted to be driven by a robot drive mechanism, such as a drive cylinder (not shown).

The link mechanism 24 also includes a second pair of integrally formed flanges 30 (only one of which is shown) for hingedly supporting a second universal joint or collar member, generally indicated at 32, for rotation about an axis $X_2$ which is co-planar with axis $X_1$. In turn, the collar member 32 hingedly supports a second link means or mechanism, generally indicated at 34, which includes integrally formed flanges 36 to allow the second link mechanism 34 to rotate about an axis $Y_2$. The second link mechanism 34 includes a second hollow, cylindrical housing 35 from which the mounting flanges 36 integrally extend. The axes $X_2$ and $Y_2$ are orthogonal and intersect at point D.

The wrist mechanism 10 further includes a tool end effector support member, generally indicated at 38, having a tool or end effector mounting surface 40 which is either supported by means of a bearing 42 for rotation about an axis $Z_2$ at the free end of the link mechanism 34 or coupled directly and rigidly to the link mechanism 34. The axis $Z_2$ intersects the axes $X_2$ and $Y_2$ at the point D and is orthogonal to both of the axes $X_2$ and $Y_2$. A point E lies on the axis $Z_2$ at the tool mounting surface 40.

On the lower surface of the tool support member 38 there is integrally formed a hollow cylindrical member 44 which partially defines a spherical joint having a center at the point C which also lies on the axis $Z_2$.

The wrist mechanism 10 also includes a solid link means or barbell, generally indicated at 46. The barbell 46 has a first integrally formed spherical end 48 which rollingly engages the cylindrical member 44 to form a spherical joint. A second integrally formed spherical end of the barbell 46 rollingly engages a cylindrical shaft 52 to define a second spherical joint having a center at point B. The cylindrical shaft 52 is centrally located within the hollow cylindrical base 12 so that the axis of the shaft 52 is coincident with the centerline of the base 12.

In one configuration of the mechanism, cylindrical shaft 52 is rigidly attached to cylindrical base 12. Parts 44 and 38 are integrally connected to part 34 and the mechanism exhibits only two degrees of freedom of motion in the XZ and YZ planes. In another configuration, the shaft 52 is rotatably supported on base 12 and parts 44 and 38 are rotatably supported on the part 35. In this way the mechanism is allowed a third degree of rotational freedom about axis $Z_2$.

The dimensions of the various parts of the mechanism 10 are chosen so that the following relationship is satisfied: AB+BC is less than or equal to AD+DC wherein AB is the distance or link between points A and B, BC is the distance or link between points B and C, AD is the distance or link between points A and D and DC is the distance or link between points D and C. In other words, the sum of the lengths of links AB and BC are equal to or less than the sum of the lengths of links AD and DC.

Also, the geometry is chosen such that the links AD and BC are of comparable length while links BC and DC are also of comparable length and are substantially shorter than either of the links AD or BC. Ideally, the relationship AB+BC equals AD+DC provides the best arrangement from a geometrical point of view. It also allows the mechanism 10 to orient the link DE in all directions, including alignment with link AB and the Z axis of the Cartesian coordinate system X, Y and Z as shown in FIG. 1.

Once aligned with the Z axis, the mechanism assumes one of two possible configurations as it moves away from alignment with the Z axis. This situation is called indefinite or unstable. Accordingly, a deviation from the equality relationship is required for construction of a stable mechanism. The preferred relationship consequently is AB+BC=AD+DC+e where e is a deviation relatively small in comparison with the other link dimensions but which is larger than the sum of all manufacturing tolerances and varying clearances of all joints. With this deviation, link DE cannot be aligned with Z axis and a conical "dead zone" is generated around the Z axis. Such a conical "dead zone" has an apex at point B where the mechanism cannot operate. The apex angle of the cone increases as the value for e is made larger. For equal values of e, positive values generate a dead zone of a smaller cone than negative values. Hence the preference for e to always be positive to insure that the sum AB+BC is less than the sum AD+BC.

Figure 2:
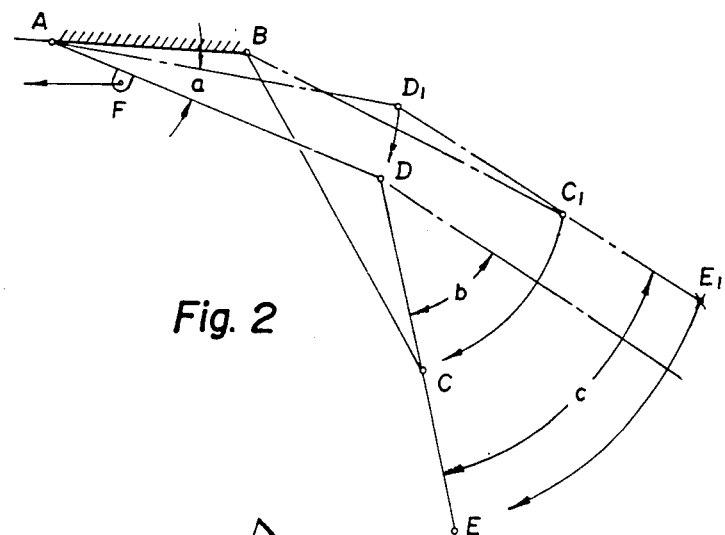
FIG. 2 is a planar view of the various links (i.e. distances) and points comprising a four-bar mechanism of the part of FIG. 1.

Referring now to FIG. 2, the principle of operation of the wrist mechanism 10 can be readily understood from the planar movement of one of the two pitch axes. The four-bar mechanism illustrated in FIG. 2 is typical of the arrangement that affects the movement of the two pitch axes. Link AB is usually fixed axially, though it can be rotated about its own axis. Link AD comprises an actuating link that is rotated about its pivot point A by means of the linear actuator 27 which is hinged to link AD at point F. The link DE is hinged to link ad at point D and is constrained by link BC which is pivoted at points B and C.

Consequently, it can be seen from FIG. 2 that a relatively small angular movement "a" of link AD about point A generates a much larger rotational angle "c" for link DE. It can also be readily seen that the change of rotation of link DE from its starting position (i.e. $D_1$, $E_1$) occurs in two stages, the first of which is a rotational angle "a" of the carrier link AD and the second of which is the additional rotation of "b" of the link DE relative to link AD.

Figure 3:
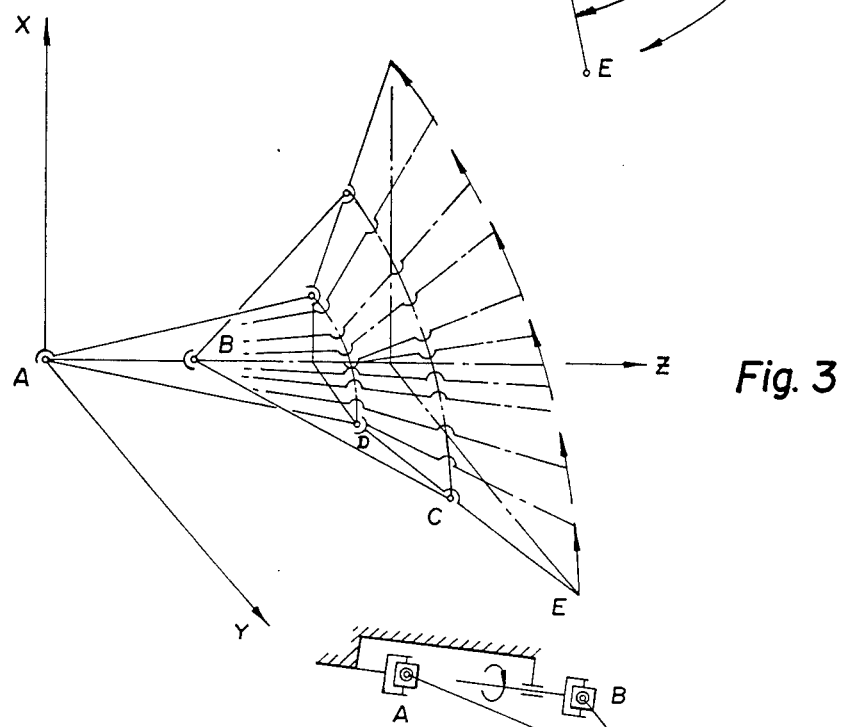
FIG. 3 illustrates the movement of the four-bar mechanism of FIG. 2 with respect to the orthogonal axes x,y and z.

For the wrist mechanism 10 of the present invention, all pivots at points A,B,C and D are spherical joints as illustrated in FIG. 3 where the link end points describe a spherical surface having its center at the pivotal point. Consequently, if the set of Cartesian coordinants XY and Z is defined at point A, then a pitch motion in the YZ plane can be realized by rotating link AD about the X axis just as the motion in the ZX plane is affected by rotating link AD about the Y axis. Combined pitch motions about the X and Y axes allow point D to trace a sphere having its center at point A. Link DE correspondingly makes three-dimensional moves.

Consequently, it can be seen that the invention of the present application utilizes a relatively simple principle to affect a change in orientation of a robotic end effector in two or more stages of bending simultaneously about two orthogonal axes.

Figure 4:
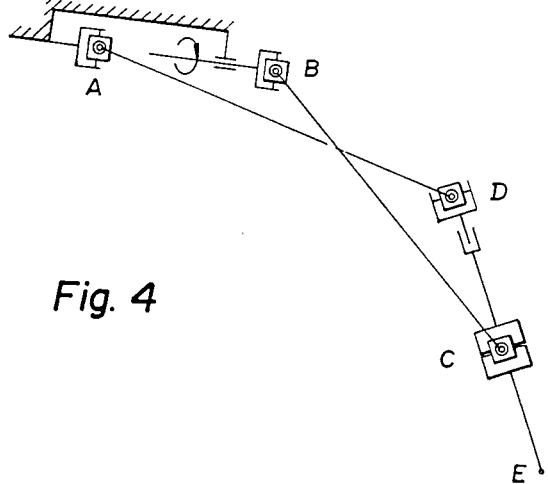
FIG. 4 is a diagram similar to the diagram of FIG. 2 wherein the various spherical joints of the robot part are depicted except the joints at points B and C comprise universal joints rather than single spherical joints.

Referring now to FIG. 4, there is illustrated the manner by which a third wrist motion is effected by rotating link AB about its own longitudinal axis, (i.e. the Z axis) and allowing the links BC and portion CE of link DE to rotate about their respective longitudinal axes. This is accomplished by constructing the joints at points B and C as universal joints having torque transmission capability while allowing member 44 to rotate on the bearing 42 relative to the cylindrical bearing 35.

By virtue of the constraining effect of link BC (i.e. the barbell 46) on link DE, the motion of the link AD around axis $X_1$ at point A causes the link DE to rotate about the axis $X_2$ at the point D.

The geometry of the wrist mechanism 10 is such that the rotation about the axis $X_2$ is substantially larger and approximately twice the angle of rotation affected about the axis $X_1$. In other words, the small angular movement affected at the base 12 by the linear actuator 20 causes a much larger angular displacement at the tool support member 38.

Consequently, when the linear actuator 27 is displaced in a manner similar to that ascribed to the linear actuator 20, its effect on the movement of link DE is similar to that described above except that the movement occurs around the Y axis instead of the X axis.

A third rotational or roll motion along the Z axis is effected by: (1) substituting universal joints for the spherical joints at points B and C as illustrated in FIG. 4; (2) rotating the central shaft 52 about the Z axis; and (3) allowing the tool support member 38 to rotate in relation to the second link mechanism 34 as shown in FIG. 1. The tool support member 38 rotates about the axis $Z_2$ in response to rotation imparted to the shaft 52 about the Z axis.

The hollow cylindrical parts 12, 16, 24, 34 and 32 are configured with dimensions large enough to accommodate the shaft 52 and the barbell 46 and still allow substantial internal space that extends along axes Z, $Z_1$ and $Z_2$. Such uninterrupted space can be used to route flexible service lines, such as cables and hoses from a robot arm connected to the base 12 and to an end effector connected to the tool support member 38.

The wrist mechanism 10 is particularly useful for robots which are controlled to perform various manufacturing and production processes such as spray painting and welding. The wrist mechanism 10 can also be used with a clamp device which can be operated to position a component during assembly.

The above-noted construction of the wrist mechanism 10 allows for a wrist mechanism which has a natural movement related to the movement of a human wrist and has three axes of freedom of movement which are kinematically independent.

The wrist mechanism 10 is constructed primarily of rotating joints and allows the routing of flexible end effector service lines such as hoses, cables and the like internal to the wrist mechanism 10. The construction also allows the wrist to have bend movements about orthogonal axes which occur in more than one stage and a generous bend radius for internally routed service lines at bend angles equal to or greater than 90 degrees.

The wrist mechanism 10 is relatively inexpensive to make compared to conventional wrist mechanisms which have complex power transmission elements. The wrist mechanism 10 also has an inherently higher mechanical efficiency such that when backdriven by the hand leadthrough method of robot programming the wrist mechanism offers relatively low mechanical resistance to the, leadthrough effort.

The invention has been described in an illustrative manner, and it is to be understood that, the terminology which has been used is intended to be in the nature of words of description rather than of limitation.

Obviously many modifications and variations of the present invention are possible in light of the above teachings. It is therefore to be understood that within the scope of the appended claims the invention may be practiced otherwise than as specifically described.

What is claimed is:

1. A robot part adapted to be driven by a robot drive means, the part comprising:
   a relatively stationary base;
   a first pair of independent rotational axes having a first point of mutual intersection (A) and being movable relative to each other;
   a second pair of independent rotational axes having a second point of mutual intersection (D) spaced a first distance (AD) from the first point of mutual intersection, the second pair of axes being movable relative to each other;
   first link means supported on said base;
   second link means being rotationally supported on each of the first pair of axes and the second link means being rotationally supported on each of the second pair of axes;
   third link means having first and second end points (B and C, respectively) fixed relative to the base, and the second link means, respectively, for establishing a fixed second distance (BC), during rotation of the first and second link means about their respective axes, wherein none of the first and second points of mutual intersection (A and D, respectively) and the first and second end points (B and C, respectively) are coincident, the first point of intersection and the first end point (A and B, respectively) defining a third distance (AB) and the second point of intersection and the second end point (D) and (C) respectively) defining a fourth distance (DC); and
   actuator means for providing independent rotation of said first link means about each of the first pair of axes to operatively transfer corresponding bend movements in more than one stage to selectively establish the position of said second link means relative to the base.

2. A mechanical wrist mechanism adapted to be driven by a robot drive means for positioning an end effector comprising:
   a relatively stationary base;
   a first point of independent rotational axes having a first point of mutual intersection (A) and being movable relative to each other;
   a second pair of independent rotational axes having a second point of mutual intersection (D) spaced a first distance (AD) from the first point of mutual intersection, the second pair of axes being movable relative to each other;
   a first line means supported on said base;
   a second link means supported on the first link means, the first link means being rotationally supported on each of the first pair of axes and the second link means being rotationally supported on each of the second pair of axes;
   end effector support means including an end effector mounting surface, the end effector support means being supported on the second link means for rotation about a third independent rotational axis;
   a rotary drive shaft rotatably supported by said stationary base;
   third link means in driving engagement with the draft shaft and the tool support member for transferring the rotary motion of the drive shaft to the tool support member, the third link means having first and second end points (B and C, respectively) fixed relative to the base and the second link means, respectively, for establishing a fixed second distance (BC) during rotation of the first and second link means about their axes wherein none of the first and second points of mutual intersection (A and D, respectively) and the first and second end points (B and C, respectively) are coincident; and
   actuator means for providing independent rotation of said first link means about the first pair of axes to operatively transfer corresponding bend movements in more than one stage to the end effector support means to selectively establish the position of said mounting surface relative to the base within a work envelope.

3. The mechanism as claimed in claim 2 wherein said actuator means includes first and second reciprocable linear actuators for rotating said first link means about the first pair of axes and wherein one of said actuators is hingedly connected to said first link means to rotate the first link means about one of said first pair of rotary axes.

4. The mechanism as claimed in claim 2 wherein at least one of said pairs of axes are orthogonal.

5. The mechanism as claimed in claim 4 wherein both pairs of axes are orthogonal.

6. The mechanism as claimed in claim 2 further comprising a first joint having a center of rotation defined by the first point of mutual intersection (A) wherein said first joint is hingedly connected to the base; and wherein said actuator means is hingedly connected to said first joint to rotate the first joint about one of said first pair of axes.

7. The mechanism as claimed in claim 6 further comprising a second joint having a center of rotation defined by the second point of mutual intersection (D) wherein said first link means is hingedly connected to said first and second joints.

8. The part as claimed in claim 1 wherein said third link means has ends which at least partially define spherical joints having centers of rotation defined by the first and second end points (B and C, respectively).

9. The mechanism as claimed in claim 6 wherein said first link means is hingedly connected to said first joint to rotate about said first pair of axes relative to the base.

10. The mechanism as claimed in claim 7 or claim 9 wherein said second link means is hingedly connected to said second joint to rotate relative to said first link means.

11. The part as claimed in claim 1 further comprising an end effector support member rotatable on a third independent rotational axis intersecting the second pair of axes at the second point of mutual intersection (D).

12. The part as claimed in claim 11 wherein said third independent rotation axis is orthogonal to each of said second pair of axes.

13. The invention as claimed in claim 11 wherein said first and second link means includes first and second hollow housings, respectively, which together at least partially define a continuously unobstructed passage between the base and the end effector support member including cavities in the first and second housings for the enclosed containment of end effector related structures.

14. The invention as claimed in claim 13 further comprising first and second joints having the first and second points of intersection (A and D), respectively, as centers of rotation, the joints including first and second hollow members hingedly connected to said first and second housings, respectively, the first and second housings and the first and second members together at least partially defining the unobstructed passage.

15. The invention as claimed in claim 14 wherein said base includes a third member which together with the first and second housings and the first and second members define the unobstructed passage.

16. The mechanism as claimed in claim 2 wherein the first point of intersection and the first end point (A and B, respectively) define a third distance (AB) and the second point of intersection and the second end point (D and C, respectively) define a fourth distance (DC) and wherein the sum of the distances AB and BC is less than the sum of the distances AD and DC.

17. The mechanism as claimed in claim 3 or claim 16 further comprising first and second universal joints at least partially defined by said third link means, the first and second universal joints having centers defined by the first and second end points (B and C, respectively).

* * * * *